May 6, 1952 H. L. SPENCER 2,595,613
HOUSE TRAILER CONSTRUCTION
Filed Dec. 3, 1948 2 SHEETS—SHEET 1
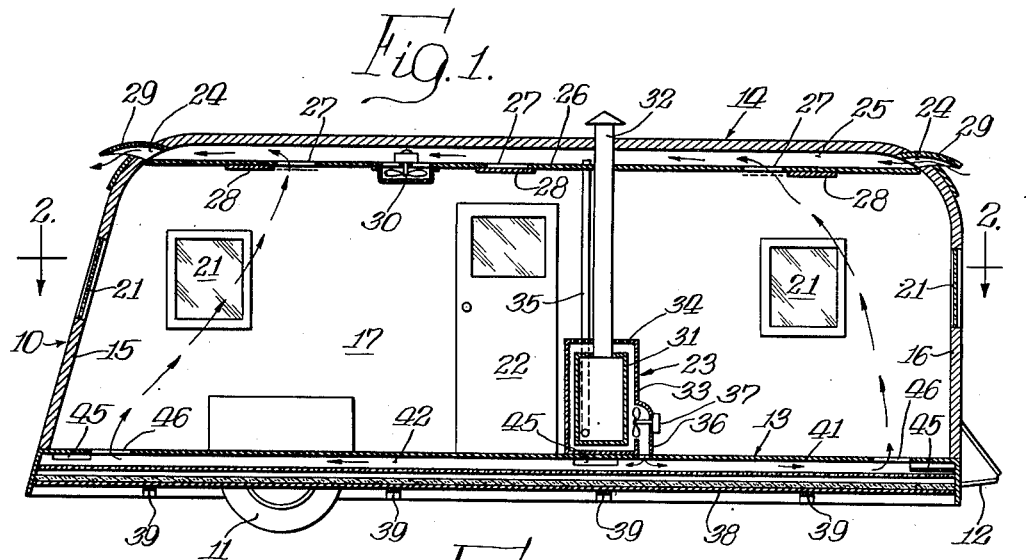
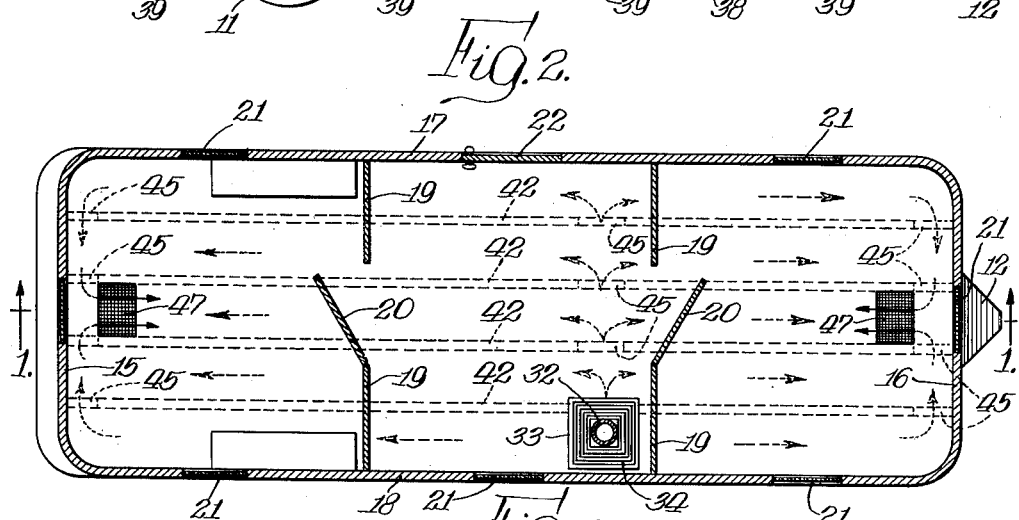
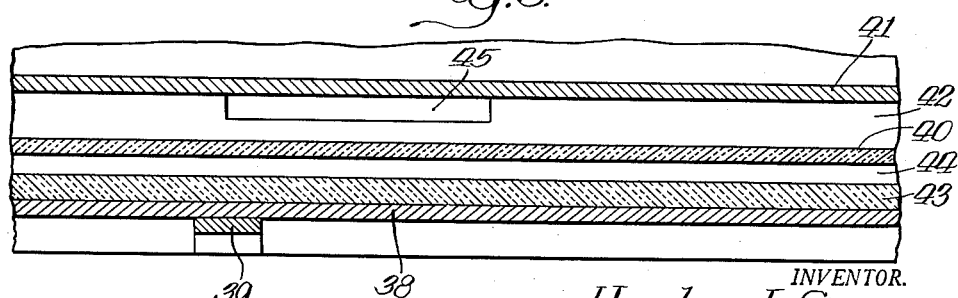
INVENTOR.
Harlan L. Spencer,
BY John A. Watson
Atty.

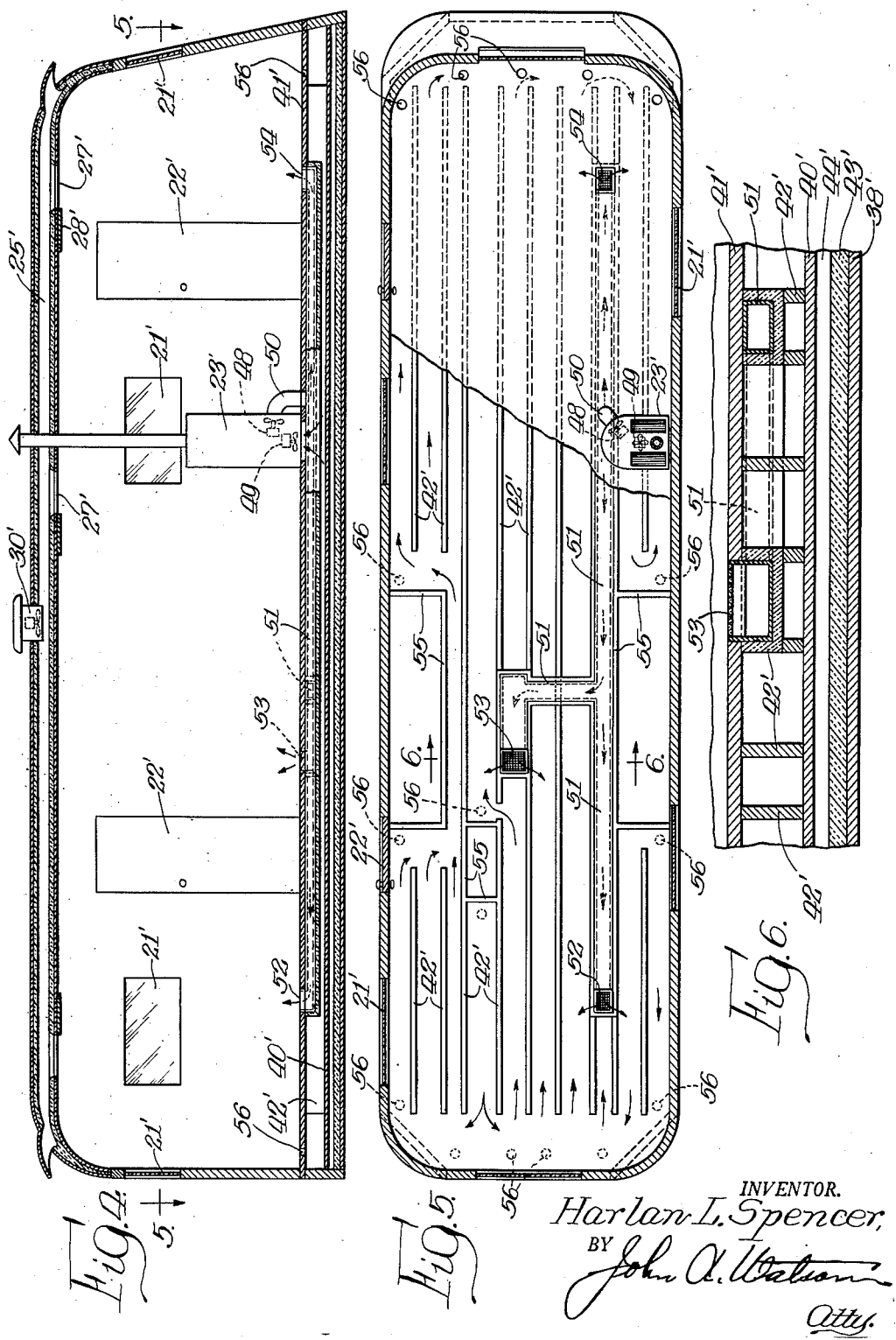

Patented May 6, 1952

2,595,613

UNITED STATES PATENT OFFICE 2,595,613

HOUSE TRAILER CONSTRUCTION

Harlan L. Spencer, Bremen, Ind.; Effie P. Spencer and The National Bank and Trust Company of South Bend, coadministrators of said Harlan L. Spencer, deceased Application December 3, 1948, Serial No. 63,315

2 Claims. (Cl. 98—10)

1

This invention pertains to the air conditioning including the heating, cooling and ventilating of trailer vehicles, but more particularly to the types constructed to provide living quarters, namely, types commonly referred to as "house trailers" or "coach trailers."

One of the primary objects of the invention is to provide, for vehicles of the types specified above, a construction of such nature as will give effective and comfortable heating, cooling and ventilation of the living space or quarters without structurally weakening the vehicle or creating drafts, localized heating or cooling or other undesirable effects, and, also, to provide a construction and arrangement whereby weather deterioration, including "sweating" and "frosting" of structural parts including the floor, walls and ceiling of the vehicle may be minimized, if not completely eliminated.

Another important object of the invention is to provide a construction for vehicles of the character described whereby the living space or quarters of the vehicle may be effectively cooled during hot weather and effectively warmed during cool or cold weather in an economically efficient manner.

Still another important object is to provide a novel construction whereby air may be circulated throughout the vehicle and its various portions which may be segregated by partitions and the like, thereby to avoid "dead" air spaces, hot spots and cold spots.

A further important object is to provide a floor construction of such character that it may effectively serve both to insulate the living quarters from heat, cold and dampness, and to effectuate or aid in effectuating other objectives including those aforesaid.

Many other objects as well as the advantages of the invention will be or should become apparent and understood after reading the following description and claims and after viewing the drawings of several illustrative embodiments.

In the drawings:

Fig. 1 is a longitudinal vertical sectional view of a trailer, taken on line 1—1 of Fig. 2 illustrating one embodiment of certain features of the invention;

Fig. 2 is a longitudinal horizontal sectional view, taken on the line 2—2 of Fig. 1, illustrating certain other features of the invention;

Fig. 3 is an enlarged fragmentary detail sectional view of the floor construction in one embodiment;

Fig. 4 is a longitudinal section, similar to that of Fig. 1, through a trailer coach employing a

2 modified form of floor construction and a somewhat different arrangement of air circulation;

Fig. 5 is a plan view of the floor of the trailer coach construction illustrated in Fig. 4, with portions cut away to show the air duct channel arrangement of this embodiment, and Fig. 6 is a transverse sectional detail view of the floor construction of the trailer coach shown in Figs. 4 and 5, the view being taken along the section line 6—6 of Fig. 5.

This application in effect is a division and a continuation-in-part of my co-pending application Serial No. 550,139, filed August 19, 1944, Patent No. 2,476,435, dated July 19, 1949.

Referring first to Figs. 1, 2 and 3, 10 generally designates the trailer vehicle as a whole which, for travel, is mounted upon wheels 11 and is drawn by a tractor such as an automobile connected to the trailer by a hitch generally designated 12. A floor generally designated 13, a roof structure generally designated 14, end walls 15 and 16 and side walls 17 and 18, together provide an enclosure defining the living space or living quarters. As indicated in Fig. 2, partition members 19 and doors 20 may be employed to separate the living space into several compartments for purposes well understood. Windows 21 and an exterior door 22 may be placed wherever desired, and a heating unit, sometimes referred to as a space heater, such as that generally designated 23, may be located within the living space in any preferred location.

The end and side walls 15, 16, 17 and 18 and the roof 14 may be composed of wood, plywood, metal or any other suitable material and, preferably, are insulated and weatherproofed in any usual or desirable manner. At the front and rear ends of the roof 14, as along the curved marginal portions thereof where they merge with the front and back walls 16 and 15, there are openings 24 which communicate with an air panel or space 25 provided between the roof structure proper and the living space by a ceiling panel 26 which spans the area between the front, rear and side walls at a distance sufficiently above the floor to provide ample head room. The ceiling panel 26, which may be composed of insulation board, has a plurality of spaced openings 27 formed therethrough and sliding panels 28 are arranged selectively to open and close such openings either fully or partially, as may be desired. The front and rear end openings in the roof structure may be equipped with adjustable hoods or louvers 29 which may be so spaced and located as to shed water and snow and prevent their entry through the openings 24, and which may be so mounted as to be selectively operated to close or open the openings 24, or either of them. A suction fan 30 may be mounted in the ceiling panel at any suitable or convenient location.

The heating unit, space heater or heat exchanger as it variously may be termed, and which is more or less diagrammatically illustrated, preferably is of a type employing an enclosed combustion chamber 31, from which the products of combustion flow to the exterior of the vehicle through a hooded exhaust pipe 32, and an outer jacket 33 spaced from the combustion chamber wall 31 to permit free circulation of air thereabout. The upper portion of the jacket 33 may be formed as a grill as indicated at 34 to permit the passage of air to and from the space between the jacket and the combustion chamber. A pipe 35 may lead either from without the trailer roof in which event its outer end will be hooded, or from within the space 25 in the roof structure into the combustion chamber to supply the air necessary to support combustion. Preferably also, the air channel between the jacket 33 and the combustion chamber 31 is connected through a conduit 36 to ducts within the floor structure, as will be described, and a fan 37, preferably of a reversible type, may be located in the conduit 36 to effect forced circulation of air from the air space within the jacket 33, and thence into the conduit 36, or vice versa.

The floor generally designated 13 is composed of what may be termed an outer panel 38 mounted upon transversely extending supports or sleepers 39, an intermediate panel 40 supported in any suitable manner and an inner panel or floor proper 41 supported upon longitudinal joists or frame members 42, which also serve as partitioning means for purposes to be described. The outer panel 38 may be composed of wood or metal although, preferably, it is composed of rigid insulation or composition board suitably waterproofed. Upon the upper surface of panel 38 is a layer of insulation material 43 such, for instance, as any blanket or batt type, but loose insulation material may be employed, although in any event it is desirable to secure the insulation to the panel 38 so that it will not be displaced. The insulation layer 43 preferably is of a thickness less than the total vertical distance between the outer and intermediate panels which, as will be noted, are spaced apart thereby to provide a relatively "dead" air space 44. Intermediate panel 40 preferably is composed of a relatively rigid composition board having insulation characteristics such as "Celotex," and may be supported by securing it to the undersides of the longitudinal frame members 42. It will be understood that the several floor panels 38, 40 and 41 extend completely over the entire floor area of the vehicle or, in other words, span the area between the side and end walls.

It will be observed that the joist or frame members 42 are notched out at their ends and at intermediate portions as indicated at 45, the purpose being to permit air to flow or circulate between the several longitudinal channels or ducts provided by the frame or joist members 42, the upper surface of the intermediate floor panel 40, and the between or under-surface of the inner floor panel 41. The upper floor panel 41 is provided with suitably located openings 46 adapted to receive registers or grills 47 so that air may flow up or down therethrough in either direction, that is, from the living quarters or living space into the panels beneath the floor panel 41, or vice versa. The arrangement is such that air heated by the space heater or heat exchanger 23 may be drawn into the jacket 33 through the grill 34 by the fan 37, which may then force the air downwardly through the conduit 36 into one of the channels beneath the floor panel 41, from which it may pass through the more or less centrally disposed notches 45 into all of the channels, thence flowing toward the opposite ends of the channels, that is, toward the opposite ends of the trailer coach, thence through the notches in the ends of the members 42 to the central channel from which it may flow upwardly into the living quarters through the grills or registers 47. The air from the living quarters then may return to the cycle path through the grill 34. Alternatively, the fan 37 together with thermo-syphon action may effect a reverse flow in the cycle path just described so that air flows upwardly through the grill 34, through the living space and thence downwardly through the grills or registers 47 into the channels beneath the floor panel 41.

The air panel or space 25 in the roof structure may be closed off from both the exterior of the vehicle by closing the louvers 29 and from the living space or quarters within the trailer by closing the panels 28 over the openings 27 in the ceiling panel 26. Under such conditions, that is, with the louvers 29 and the openings 27 closed, air circulation within the living space may depend entirely upon thermo-syphon principles, the fan 37 and what air may be admitted or allowed to escape through the doors and windows. On the other hand, the louvers 29 may be opened partially or fully and the openings 27 in the ceiling panel kept closed, in which event air from the space 25 may be blown into the living quarters by the fan 30, or, if the fan is reversible, air may be exhausted from the living quarters into the space 25 by the fan 30. Either through the opening in which the fan 30 is located or through one or more of the openings 27, air may be educted from the living quarters by opening both louvers 29 and permitting a flow of air through the space 25. If the living space of the vehicle is partitioned into rooms or compartments by partitions such as those indicated at 19, the louvers 29, or either of them, may be closed or partially closed and two or more of the passages or openings 27 opened to cause air to flow from one compartment to another through the space 25. Again, fan 30 may be employed to assist in such flow, or the opening in which it is mounted in the ceiling panel may serve in place of one of the other openings 27 to permit flow of air between space 25 and the living quarters. It should be understood that the drawings and the various air cycles herein described are by way of exemplification of air conditioning attainable with the invention, which is susceptible of other embodiments both in construction and air flow cycling. The construction employing the roof and ceiling panel arrangement hereinabove described is fully set forth and claimed in my co-pending application Serial No. 550,139, above mentioned.

The form of the invention illustrated in Figs. 4, 5 and 6 does not differ fundamentally from that above described, and the description thereof will be limited solely to the features of difference. In this form the heater or heat exchanger 23' may be equipped with two fans or blowers 48 and 49, each of which may be reversible. A duct 50 leads from the jacket of the heater through the upper floor panel 41' into warm air ducts 51 which lead to grilled or register outlets 52, 53 and 54 in the floor panel 41'. Ducts 51 are insulated along their lengths from air flowing in the channels provided by the longitudinal frame or joist members 42', as will be apparent from the view of Fig. 6. In this construction and arrangement the joists 42' terminate short of the ends of the vehicle so that air may freely flow about the space between the ends of such joists and the inner and intermediate floor panels 41' and 40' respectively. Portions of the vehicle floor area which may be utilized for the location of closets, refrigerators, sinks and like structures and objects may be boxed off as indicated at 55 between the inner and intermediate floor panels since it is unnecessary or undesirable to employ such portions of the vehicle in the air circulation system. The joist or frame members 42' preferably are also terminated in spaced relation to the boxed off portions 55 so as to maintain a flow of air within the ducts or channels provided between the joists and the inner and intermediate floor panels.

The inner floor panel 41', preferably adjacent to the side and end walls of the vehicle and at other places where air flow might otherwise cease or be very slow, is apertured as indicated at 56 so that air may flow in either direction between the channels beneath the floor panel 41' and the living quarters or living space thereabove. In this instance the fan 30' is located through the roof proper and not in the ceiling panel, and may either be used to force air from the exterior of the vehicle into the air space 25' and thence into the living quarters through openings 27' when sliding closures 28' are open or, for exhausting air from within the living quarters, all as will be understood.

Air cycling, for heating or cooling, may follow any of the cycle patterns described in connection with the form of the invention shown in Figs. 1 to 3 inclusive. Preferably, however, for heating the vehicle the fan 48 will force air heated by the heater 23' down the duct 50 into the ducts 51 through which it flows to the register or grills 52, 53 and 54 and thence into the living space, return air flowing from the living space down through the openings or apertures 56 into the channels provided by the framing or joists 42' and the intermediate and inner floor panels 40' and 41', respectively, and back to the heater, the fan 49 being employed to supplement this flow if desired. It is to be assumed, of course, that the heater would employ suitable baffles to prevent the simultaneous operation of the two fans 48 and 49 from short-circuiting the flow of air through the heater. Alternatively, by reversing the fans 48 and 49, air may be caused to flow in a reverse direction through the several channels, the living space and the floor ducts.

Although not illustrated in the form of the invention of Figs. 4, 5 and 6, the living space of the trailer coach will ordinarily be partitioned off in the usual manner to provide 2, 3 or more rooms, and the side and end walls will be suitably insulated against heat transfer. Doors 22' and windows 21' will be located wherever it is desired so that additional ventilation may be secured through these media as well as through the positive circulatory system above described. Running gear including wheels and a draft hitch by which the trailer coach would be attached to a tractor have been omitted for the sake of simplification.

It will be appreciated that the construction and arrangement of the floor in combination with air circulating ducts and positive circulating means, provides a very efficient and satisfactory means by which vehicles of this character may be heated or cooled, whether running or standing still and regardless of outside weather conditions. Occupants of the vehicle may adjust the various air circulating and circulation control mechanisms and parts to suit their own convenience and comfort and, where desired, automatic controls may be installed to regulate the temperature in the living quarters. Although I have disclosed the invention in only two forms it will be appreciated and understood that it is susceptible of embodiment in various other forms and with various modifications without departing from the spirit thereof or the scope of the appended claims.

I claim:

1. A floor construction for house-trailer vehicles and the like having side and end walls and a roof structure which, together with the floor, provide an enclosed space, there also being means interrupting the continuity of said enclosed space to provide compartments, comprising, outer, intermediate and inner panels arranged and supported in substantially parallel planes and in spaced relation to one another over substantially the entire floor area, thermal insulating material disposed over the inner surface of the outer panel with its uppermost surface spaced from the under surface of the intermediate panel, said intermediate panel being composed of a relatively thermal nonconductive material, partitioning members disposed in parallel spaced relation to one another between said intermediate and inner panels and extending from the under surface of the inner panel to the upper surface of the intermediate panel and substantially from a place adjacent to one of said walls to a place adjacent to an opposite wall thereby to provide ducts for the flow of air in channels between the intermediate and inner panels, said partitioning members being interrupted at places adjacent to said opposite walls to interconnect the air channels thereat, said inner floor panel having openings therethrough to certain of the said compartments within said enclosed space at spaced places including places adjacent to each of said opposite walls for effecting air circulation communication between said air channels and said enclosed space, ducts mounted in and extending through certain of the first said ducts out of direct communication therewith and having communication at spaced places with the air in certain of said compartments within said enclosed space, the second said ducts being of substantially less cross-sectional area than the corresponding cross-sectional area of the first ducts through which they pass, heat exchange means in said enclosed space, and means for establishing a cycle of forced air flow including the first and second said ducts, those certain of said compartments to which said second ducts extend within said enclosed space and said heat exchange means.

2. A floor construction for house-trailer vehicles and the like having side and end walls and a roof structure which, together with the floor, provide an enclosed space, there also being means interrupting the continuity of said enclosed space to provide compartments comprising, outer and inner panels arranged and supported in substantially parallel planes and in spaced relation to one another over substantially the entire floor area, thermal insulating material disposed over the inner surface of the outer panel with its uppermost surface spaced from the under surface of the inner panel, partitioning members disposed in parallel spaced relation to one another between said outer and inner panels and extending downwardly from the under surface of the inner panel toward the upper surface of the outer panel and substantially from a place adjacent to one of said walls to a place adjacent to an opposite wall thereby to provide ducts for the flow of air in channels between the outer and inner panels, said partitioning members being interrupted at places adjacent to said opposite walls to interconnect the air channels thereat, said inner floor panel having openings therethrough to certain of said compartments within said enclosed space at spaced places including places adjacent to each of said opposite walls for effecting air circulation communication between said air channels and said enclosed space, ducts mounted in and extending through certain of the first said ducts out of direct communication therewith and having communication at spaced places with the air in certain of said compartments within said enclosed space, the second said ducts being of substantially less cross-sectional area than the corresponding cross-sectional area of the first said ducts through which they pass, heat exchange means in said enclosed space, and means for establishing a cycle of forced air flow including the first and second said ducts, those certain of said compartments to which said second ducts extend within said enclosed space and said heat exchange means.

HARLAN L. SPENCER.

REFERENCES CITED

The following references are of record in the file of this patent:

UNITED STATES PATENTS

| Number | Name | Date |
|---|---|---|
| 264,460 | Kennedy | Sept. 19, 1882 |
| 469,296 | Eastman | Feb. 23, 1892 |
| 1,013,517 | Robbins et al. | Jan. 2, 1912 |
| 1,308,188 | Moore | July 1, 1919 |
| 2,221,001 | Lucius | Nov. 12, 1940 |
| 2,225,244 | Anderson | Dec. 17, 1940 |
| 2,273,176 | Burt | Feb. 17, 1942 |
| 2,476,435 | Spencer | July 19, 1949 |